Aug. 18, 1931.  T. H. BANFIELD  1,819,859
SHAFT COUPLING
Filed Aug. 20, 1928
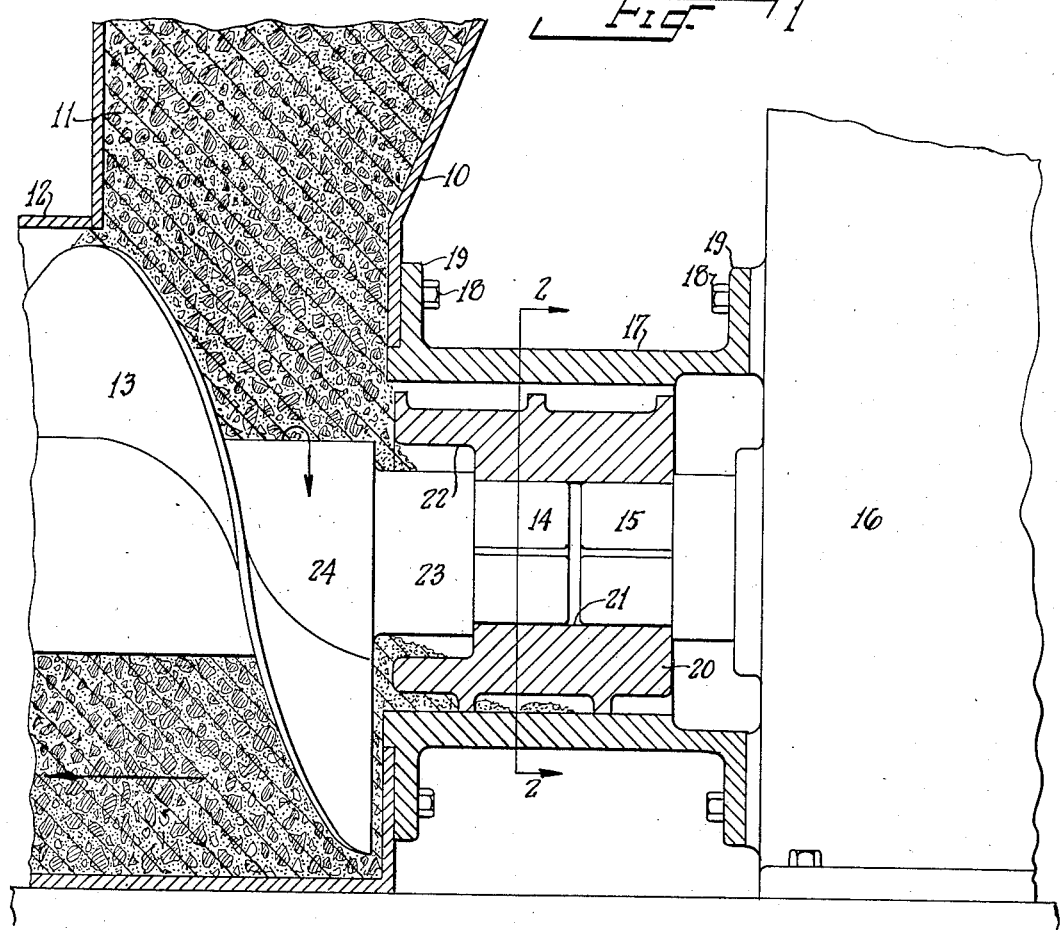
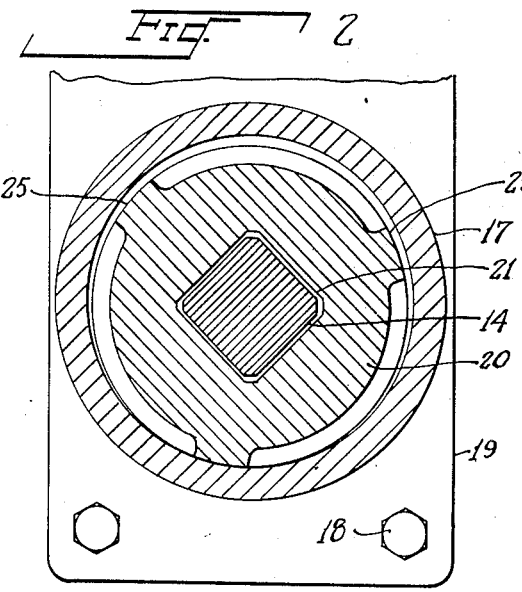
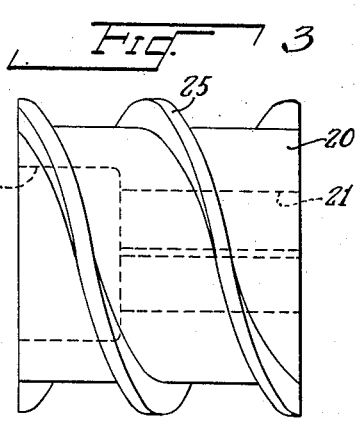
INVENTOR
T. H. Banfield
BY
ATTORNEY Patented Aug. 18, 1931

1,819,859

UNITED STATES PATENT OFFICE

THOMAS H. BANFIELD, OF PORTLAND, OREGON, ASSIGNOR TO IRON FIREMAN MANUFACTURING COMPANY, OF PORTLAND, OREGON

SHAFT COUPLING

Application filed August 20, 1928. Serial No. 300,791.

This invention relates generally to coal burning stokers and particularly to that type of stoker in which coal is fed from a hopper upwardly into a retort by means of a screw.

The main object of this invention is to provide a simple and efficient from of coupling whereby the coal will be prevented from packing around the coupling and finding its way into the gear case.

The second object is to permit a relatively loose fit to exist between the feed screw and the operating shaft without danger of the accumulation of coals in the clearances provided.

The third object is to so construct the coupling that its exterior portion is of itself a conveyor.

These, and other objects, will become more apparent from the specification following as illustrated in the accompanying drawings, in which:

Figure 1 is a vertical longitudinal section thru a typical form of installation. Figure 2 in a section taken along the line 2—2 in Figure 1. Figure 3 is a side elevation of a coupling.

Similar numbers of reference refer to similar parts throughout the several views.

Referring in detail to the drawings, there is shown the usual form of fuel magazine 10 for supplying coal 11 to a fuel duct 12 in which is loosely mounted a fuel feed screw 13 provided with a square turning shank 14, which is in line with a similar shank 15 of a transmission 16 of which only the casing is illustrated since these devices are well understood in the art. The cylindrical sleeve 17 connects the fuel duct 12 and the casing 16 by means of the bolts 18 which pass through the flanges 19.

Turning now to my device, it will be seen to consist of a cylindrical collar 20 having a square opening 21 formed therein to loosely receive the shanks 14 and 15 and is also provided with a counter bore 22 to receive the enlarged portion 23 of the fuel screw shaft 24. On the outside of the coupling 20 are formed the flights 25, the function of which is to feed out the coals which may find their way between the coupling 20 and the sleeve 17.

It is understood that in some instances the flights may be cast directly upon the shaft 24 and a recess formed therein for the reception of the shaft 15, although in most cases this construction is impractical owing to the difficulty of casting these parts.

I claim:

1. A coupling for coal burning stokers consisting of a cylindrical body member having a square opening formed therein and having an enlarged recess formed at one end thereof and helical flights formed around the outer surface of said coupling.

2. In a coal burning stoker the combination of a fuel feed screw, a shaft for driving said screw, a coupling joining said shaft and screw, said coupling having conveyor flights formed around same, and a sleeve around said coupling forming a journal therefor.

3. The combination of a screw conveyor with a sleeve forming a journal for the driving end thereof, and a coupling for driving said conveyor journaling in said sleeve the exterior of said coupling having conveyor flights formed thereon adapted to remove any fuel which may enter the clearance space between said journal and coupling.

4. A coupling for feed worms having means for attaching a driving shaft to a feed worm, and having a spiral conveyor formed on the outer surface thereof and a sleeve forming the sole support for the coupling.

5. In a stoker the combination of a fuel feed duct, a feed worm in said duct, a sleeve at the inlet end of said duct into which the shaft of said worm extends, and a coupling for said shaft end journaling solely in said sleeve having a spiral conveyor formed around same to prevent fuel from passing through said sleeve from said fuel feed duct.

6. The combination of a sleeve, a spiral coupling mounted in said sleeve, a feed worm at one end of said spiral coupling, and a driving means at the other end of said spiral coupling, said coupling having a free working clearance between same and said sleeve from which fuel can be moved by said spiral coupling toward said worm.

THOMAS H. BANFIELD.